(12) United States Patent
Cucerzan et al.

(10) Patent No.: US 9,323,833 B2
(45) Date of Patent: Apr. 26, 2016

(54) RELEVANT ONLINE SEARCH FOR LONG QUERIES

(75) Inventors: Silviu-Petru Cucerzan, Redmond, WA (US); Anthony James Fader, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 320 days.

(21) Appl. No.: 13/021,975

(22) Filed: Feb. 7, 2011

(65) Prior Publication Data

US 2012/0203772 A1 Aug. 9, 2012

(51) Int. Cl.
*G06F 7/00* (2006.01)
*G06F 17/30* (2006.01)

(52) U.S. Cl.
CPC .... *G06F 17/30672* (2013.01); *G06F 17/30864* (2013.01)

(58) Field of Classification Search
CPC .......... G06F 17/30637; G06F 17/3064; G06F 17/30731; G06F 17/30861; G06F 17/30867
USPC .......................... 707/705, 758, 759, 765, 768
See application file for complete search history.

(56) References Cited

U.S. PATENT DOCUMENTS

| | | | |
|---|---|---|---|
| 5,864,846 A * | 1/1999 | Voorhees et al. | 707/5 |
| 6,256,627 B1 * | 7/2001 | Beattie et al. | 707/6 |
| 6,920,448 B2 * | 7/2005 | Kincaid et al. | 707/3 |
| 7,051,023 B2 | 5/2006 | Kapur et al. | |
| 7,110,998 B1 | 9/2006 | Bhandari et al. | |
| 7,149,732 B2 * | 12/2006 | Wen et al. | 707/4 |
| 7,558,787 B2 * | 7/2009 | Parikh | 707/3 |
| 7,565,627 B2 | 7/2009 | Brill et al. | |
| 7,739,264 B2 | 6/2010 | Jones et al. | |
| 7,996,379 B1 * | 8/2011 | Jain | 707/706 |
| 8,005,823 B1 * | 8/2011 | Marshall et al. | 707/721 |
| 8,326,826 B1 * | 12/2012 | Upstill et al. | 707/723 |
| 2003/0014405 A1 | 1/2003 | Shapiro et al. | |
| 2006/0206476 A1 * | 9/2006 | Kapur et al. | 707/5 |
| 2007/0050393 A1 * | 3/2007 | Vogel et al. | 707/102 |
| 2007/0136251 A1 * | 6/2007 | Colledge et al. | 707/3 |
| 2008/0104061 A1 | 5/2008 | Rezaei | |
| 2008/0172615 A1 | 7/2008 | Igelman et al. | |
| 2008/0208864 A1 | 8/2008 | Cucerzan et al. | |

(Continued)

OTHER PUBLICATIONS

Balasubramanian, et al., "Exploring Reductions for Long Web Queries", Proceedings of the 33rd Annual International Association for Computing Machinery (ACM) Special Interest Group on Information Retrieval (SIGIR) conference on Research and Development in Information Retrieval, Jul. 19-23, 2010, pp. 8, ACM, Geneva, Switzerland.

(Continued)

*Primary Examiner* — Marc Somers
(74) *Attorney, Agent, or Firm* — Sandy Swain; Micky Minhas (57) ABSTRACT

Online information is retrieved for a user. An original query submitted by the user is received which includes a plurality of query terms the user associates with particular online information the user is interested in. The original query is then analyzed using data from an online knowledge repository and a historical query log of a search engine to determine central concepts of the original query. A revised query results from this analysis which includes one or more of the central concepts. The revised query is then submitted to the search engine. Search results for the revised query are then provided to the user.

19 Claims, 6 Drawing Sheets

(56) References Cited

U.S. PATENT DOCUMENTS

2008/0306934 A1    12/2008    Craswell et al.
2008/0313147 A1*   12/2008    Svore et al. .................. 707/3
2011/0055233 A1*    3/2011    Weber et al. ................ 707/752
2011/0202533 A1*    8/2011    Wang et al. ................. 707/738
2012/0191745 A1*    7/2012    Velipasaoglu et al. ....... 707/767

OTHER PUBLICATIONS

Bendersky, et al, "Discovering key concepts in verbose queries", Proceedings of the 31st Annual International Association for Computing Machinery (ACM) Special Interest Group on Information Retrieval (SIGIR) conference on Research and Development in Information Retrieval, Jul. 20-24, 2008, pp. 8, ACM, Singapore.

Bendersky, et al., "Analysis of Long Queries in a Large Scale Search Log", Proceedings of the 2009 workshop on Web Search Click Data (WSCD), Feb. 9, 2009, pp. 7, Association for Computing Machinery (ACM), Barcelona, Spain.

Downey, et al., "Understanding the Relationship Between Searchers' Queries and Information Goals", Proceedings of the 17th Association for Computing Machinery (ACM) Conference on Information and Knowledge Management (CIKM), Oct. 26-30, 2008, pp. 10, ACM, California, USA.

Huang, et al., "Analyzing and Evaluating Query Reformulation Strategies in Web Search Logs", Proceedings of the 18th Association for Computing Machinery (ACM) Conference on Information and Knowledge Management (CIKM), Nov. 2-6, 2009, pp. 10, ACM, Hong Kong, China.

Huston, et al., "Evaluating Verbose Query Processing Techniques", Proceedings of the 33rd Annual International Association of Computing Machinery (ACM) Special Interest Group on Information Retrieval (SIGIR) conference on Research and Development in Information Retrieval, Jul. 19-23, 2010, pp. 8, ACM, Geneva, Switzerland.

Jones, et al., "Generating Query Substitutions", Proceedings of the 15th international conference on World Wide Web, May 23-26, 2006, pp. 10, Association for Computing Machinery (ACM), Edinburgh, Scotland.

Kumaran, et al., "A Case for Shorter Queries, and Helping Users Create Them", Proceedings of North American Chapter of the Association for Computational Linguistics (NAACL) Human Language Technologies (HLT), Apr. 2007, pp. 8, Association for Computational Linguistics, Rochester, NY, USA.

Kumaran, et al., "Effective and Efficient User Interaction for Long Queries", Proceedings of the 31st Annual International Association for Computing Machinery (ACM) Special Interest Group on Information Retrieval (SIGIR) conference on Research and Development in Information Retrieval, Jul. 20-24, 2008, pp. 8, ACM, Singapore.

Kumaran, et al., "Reducing Long Queries Using Query Quality Predictors", Proceedings of the 32nd Annual International Association for Computing Machinery (ACM) Special Interest Group on Information Retrieval (SIGIR) conference on Research and Development in Information Retrieval, Jul. 19-23, 2009, pp. 8, ACM, Boston, Massachusetts, USA.

Tan, et al., "Unsupervised Query Segmentation Using Generative Language Models and Wikipedia", Proceedings of the 17th international conference on World Wide Web, Apr. 21-25, 2008, pp. 10, Association for Computing Machinery (ACM), Beijing, China.

Cucerzan, Silviu, "Large Scale Named Entity Disambiguation Based on Wikipedia Data", Proceedings of the 2007 Joint Conference on Empirical Methods in Natural Language Processing and Computational Natural Language Learning, Jun. 2007, pp. 9, Association for Computational Linguistics, Prague, Czech Republic.

Chen, et al., "A Query Substitution-Search Result Refinement Approach for Long Query Web Searches", 2009 Institute of Electrical and Electronics Engineers (IEEE) / Web Intelligence Consortium (WIC) / Association for Computing Machinery (ACM) International Conference on Web Intelligence and Intelligent Agent Technology, Sep. 15-18, 2009, pp. 7, IEEE, Milan, Italy.

Croft, W. Bruce, "Query Evolution", Presentation retrieved at << http://ciir.cs.umass.edu/whatsnew/query-evolution-france.pdf >>, 2009, pp. 59, W.B.Croft.

* cited by examiner

RELEVANT ONLINE SEARCH FOR LONG QUERIES

BACKGROUND

The Internet is a global data communications system that serves billions of users worldwide. The Internet provides users access to a vast array of online information resources and services, including those provided by the World Wide Web, intranet-based enterprises, and the like. Online search engines generally provide the ability to search for online information on a specific computing device, or on a network such as the Internet or a private network. Thanks to the ubiquity of personal computers, the Internet and the World Wide Web, users routinely employ search engines to locate particular online information they are interested in. This information of interest may be either information that the users have visited/viewed before, or new information that the users have not yet visited/viewed. The search results displayed to the users may include a wide variety of different types of online information such as web sites or particular web pages therein, documents, images, audio, video, and other types of files and information. Many different online search engines exist today which vie for popularity.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Online search technique embodiments described herein generally involve retrieving online information for a user. In an exemplary embodiment an original query submitted by the user is received. The original query includes a plurality of query terms that the user associates with particular online information they are interested in. The original query is then analyzed using data from an online knowledge repository and a historical query log of a search engine to determine central concepts of the original query. A revised query results from this analysis which includes one or more of the central concepts. The revised query is then submitted to the search engine. Search results for the revised query are then provided to the user.

DESCRIPTION OF THE DRAWINGS

The specific features, aspects, and advantages of the online search technique embodiments described herein will become better understood with regard to the following description, appended claims, and accompanying drawings where:

DETAILED DESCRIPTION

In the following description of online search technique embodiments reference is made to the accompanying drawings which form a part hereof, and in which are shown, by way of illustration, specific embodiments in which the online search technique can be practiced. It is understood that other embodiments can be utilized and structural changes can be made without departing from the scope of the online search technique embodiments.

The term "online information" is used herein to refer to any type of information that is accessible via a data communications network such as the Internet or a private network. Exemplary types of online information include, but are not limited to, a document, an image, a video clip, an audio clip, and a web page which can include an interrelated collection of one or more of these information types.

1.0 Online Search Engine Queries

As described heretofore, users routinely employ an online search engine (hereafter simply referred to as a "search engine") or a plurality of different search engines, to locate particular online information they are interested in. In other words, users submit queries to search engines for particular online information they intend to navigate to. As is appreciated in the arts of personal computing, the Internet and the World Wide Web, these information searches can be performed within various realms such as a specific computing device, a specific web site, a specific enterprise intranet, or the World Wide Web, among others. These information searches can also be initiated by the users from various types of computing devices such as a personal computer and a mobile device, among others.

By way of example but not limitation, a given user who is interested in particular online information can submit a query to a given search engine and the search engine can subsequently provide the user with search results in the following manner. The user can employ a browser application to submit the query, where the query includes one or more query keywords (hereafter referred to as "terms") that the user associates with the particular information they are interested in. Upon receiving the query, the search engine searches one of the aforementioned realms and identifies items of online information therein that it determines to be related to the user's query. The search engine then transmits search results for the query to the browser application. The search results generally include a ranked list of one or more items of online information each of which are identified by a different information link (such as a Uniform Resource Locators (URL) or the like). In other words, each information link specifies where a given identified item of online information is located (such as its Internet location and the like), and provides a mechanism for retrieving the item. Upon receiving the search results, the browser application displays the search results to the user. The user can then select (e.g., click on) a given information link in the search results in order to view additional content of the particular item of online information that is associated with the link.

As is appreciated in the arts of the Internet and World Wide Web, each search engine generally maintains an historical query log which provides historic insight into the behavior of the search engine in response to receiving queries submitted from a potentially very large collection of users. The query log includes a wide variety of data including, but not limited to, each query that was received by the search engine, an identification of the user that submitted the query, the information links that each user selected in the search results that were provided to the user, the rank position within the search results of each of the selected information links, and time stamp information, among others.

2.0 Relevant Online Search for Long Queries

The online search technique embodiments described herein generally involve retrieving online information in response to receiving a query submitted by a user for particular online information the user is interested in. The online search technique embodiments described herein are advantageous for various reasons including, but not limited to, the following. The online search technique embodiments generally result in the retrieval of online information that is particularly relevant to the user's needs regardless of the length of the user's query (i.e., regardless of the number of terms in the query) and the number of times the query has previously been submitted by any user. As will be appreciated from the more detailed description that follows, the online search technique embodiments are particularly advantageous when a long query is submitted to the search engine by the user. The term "long query" is defined herein to be a query having five or more query terms. As is appreciated in the arts of the Internet and World Wide Web, a large percentage of the queries submitted to search engines by users are long queries. The online search technique embodiments are also advantageous in that they can reduce the amount of time it takes for the user to navigate to the particular online information they are interested in.

2.1 Architectural Framework

Figure 1:
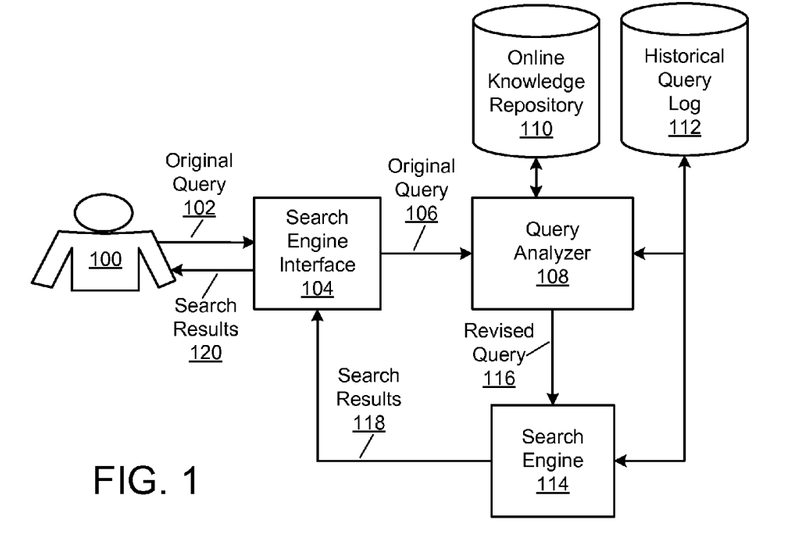
FIG. 1 is a diagram illustrating an exemplary embodiment, in simplified form, of an architectural framework for implementing the online search technique embodiments described herein.

FIG. 1 illustrates an exemplary embodiment, in simplified form, of an architectural framework for implementing the online search technique embodiments described herein. As exemplified in FIG. 1, a user 100 submits an original query 102 which includes a plurality of query terms that the user associates with particular online information content they are interested in. The original query 102 is received by a search engine interface 104, which forwards the original query 106 to a query analyzer 108. As will be described in more detail hereafter, the query analyzer 108 receives the original query 106 and then analyzes it using data from a conventional online knowledge repository 110 and an historical query log 112 of a conventional search engine 114. This query analysis results in a revised query 116 which the query analyzer 108 then submits to the search engine 114. The search engine 114 receives the revised query 116 and then retrieves a set of search results 118 for the revised query. The search results 118 for the revised query 116 can then be provided to the user 100 in various ways including, but not limited to, the following. In one embodiment of the online search technique exemplified in FIG. 1, the search engine 114 can deliver the search results 118 for the revised query 116 directly to the search engine interface 104, which can then deliver the search results 120 to the user 100. In another embodiment of the online search technique (not shown), the search engine can deliver the search results for the revised query to the query analyzer, which can then deliver these search results to the search engine interface.

Referring again to FIG. 1, the online search technique embodiments described herein can be implemented using various types of online knowledge repositories 110. In an exemplary embodiment of the online search technique described herein Wikipedia® is employed as the online knowledge repository 110. Alternate embodiments of the online search technique are also possible which employ other types of online knowledge repositories including, but not limited to, Freebase or a variety of specialized repositories which are specific to particular information domains (such as the Internet Movie Database (IMDb®), among others). Additional embodiments of the online search technique are also possible which employ a combination of two or more different online knowledge repositories. The online search technique embodiments can also be implemented using various types of search engines 114. In an exemplary embodiment of the online search technique, Bing™ (a trademark of Microsoft Corporation) is employed as the search engine 114. Alternate embodiments of the online search technique are also possible which employ other search engines such as Google® and Ask®, among others.

2.2 Process Framework

Figure 2:
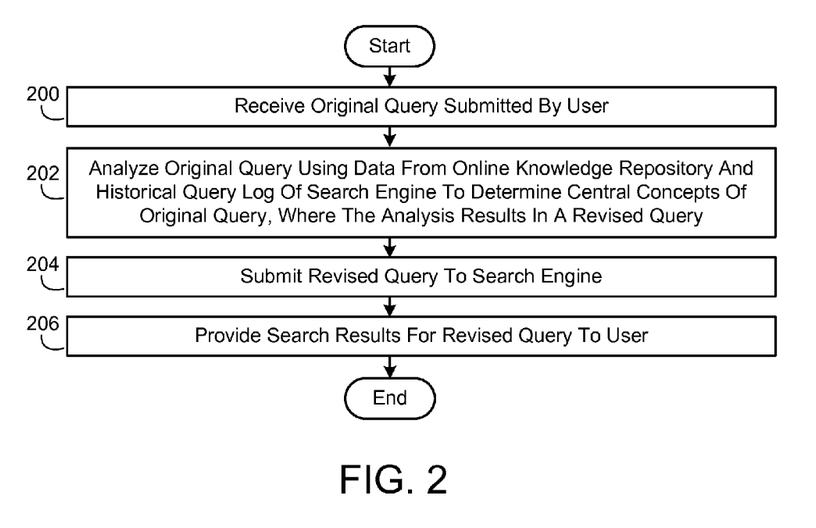
FIG. 2 is a flow diagram illustrating an exemplary embodiment, in simplified form, of a process for retrieving online information for a user.

FIG. 2 illustrates an exemplary embodiment, in simplified form, of a process for retrieving online information for a user. As exemplified in FIG. 2, the process starts in block 200 with receiving an original query submitted by the user, where the original query includes a plurality of query terms that the user associates with particular online information they are interested in. The original query is then analyzed using data from the online knowledge repository and the historical query log of the search engine to determine central concepts of the original query, where this analysis results in a revised query which includes one or more of these central concepts (block 202). The revised query is then submitted to the search engine (block 204). Finally, search results for the revised query are provided to the user (block 206), where these results are particularly relevant to the particular online information the user is interested in.

Figure 3:
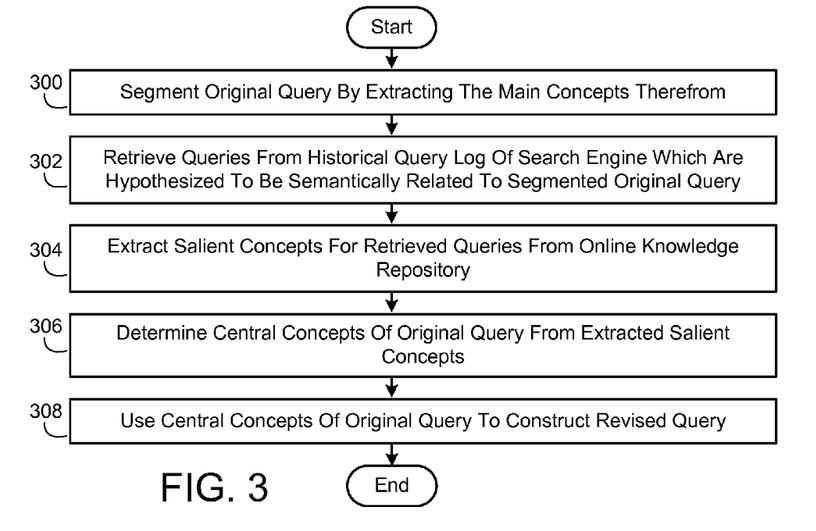
FIG. 3 is a flow diagram illustrating an exemplary embodiment, in simplified form, of a process for analyzing an original query submitted by the user using data from an online knowledge repository and a historical query log of a search engine to determine central concepts of the original query.

FIG. 3 illustrates an exemplary embodiment, in simplified form, of a process for analyzing the original query using data from the online knowledge repository and the historical query log of the search engine to determine central concepts of the original query. As exemplified in FIG. 3, the process starts in block 300 with segmenting the original query by extracting the main concepts therefrom, where each extracted main concept includes one or more of the query terms in the original query. By way of example but not limitation, in the case where the original query is growth and development of infancy stage an exemplary resulting segmented query is [growth and development] of [infancy] [stage]. As indicated by the brackets, this segmented query has three different main concepts that are extracted from the original query, namely growth and development, infancy and stage. The main concepts can be extracted from the original query in various ways including, but not limited to, the following. In one embodiment of the online search technique described herein the original query is processed using a conventional trie (also known in the art of computer science as a "prefix tree") search method based on the data from the online knowledge repository. In another embodiment of the online search technique the original query is processed using a conventional co-occurrence extraction method based on query term co-occurrence statistics from the historical query log of the search engine. In yet another embodiment of the online search technique the original query is processed using a combination of the trie search and co-occurrence extraction methods.

Referring again to FIG. 3, once the original query has been segmented (block 300), one or more queries are retrieved from the historical query log of the search engine which are hypothesized to be semantically related (e.g., semantically similar) to the segmented original query (block 302). This retrieval can be implemented in various ways including, but not limited to, the following. In one embodiment of the online search technique described herein queries having at least two concepts in common with the segmented original query are retrieved from the historical query log. In another embodiment of the online search technique, rather than simply retrieving queries from the historical query log that have at least two concepts in common with the segmented original query, the following two-stage method is employed. First, queries having at least two concepts in common with the segmented original query are identified in the historical query log. Then, for each identified query, queries that follow the identified query in the same search session as the identified query and have at least one concept in common with the segmented original query are retrieved from the historical query log. By way of example but not limitation, in the case where the segmented original query is [growth and development] of [infancy] [stage] as described heretofore, the following are examples of some of the queries in the historical query log that are hypothesized to be semantically related to the segmented original query and thus are retrieved from the historical query log:

different stages of growth and development of infancy
infancy stage of growth and development
different stages of growth and development of childhood
infancy growth and development
development of a child during infancy
growth and development of all stages
development of infancy
development of emotions infancy
fifth year of infancy growth and development
stages of growth and development of a person
stages of growth and development of a human being
and so on.

Referring again to FIG. 3, once one or more queries have been retrieved from the historical query log of the search engine which are hypothesized to be semantically related to the segmented original query (block 302), salient concepts for the retrieved queries are extracted from the online knowledge repository (block 304). This salient concept extraction can be implemented in various ways including, but not limited to, the following. In one embodiment of the online search technique described herein salient concepts for the retrieved queries are extracted from the online knowledge repository by using a concept extraction and disambiguation method to parse the retrieved queries as a single document. As is appreciated in the art of knowledge repositories, a given concept in the online knowledge repository is represented in both the topic space and the context space. The concept extraction and disambiguation method is generally advantageous in that the salient concepts for the retrieved queries that are extracted from the online knowledge repository are coherent between the topic and context spaces. Various concept extraction and disambiguation methods can be used such as a conventional large-scale named entity disambiguation method, among others.

Figure 4:
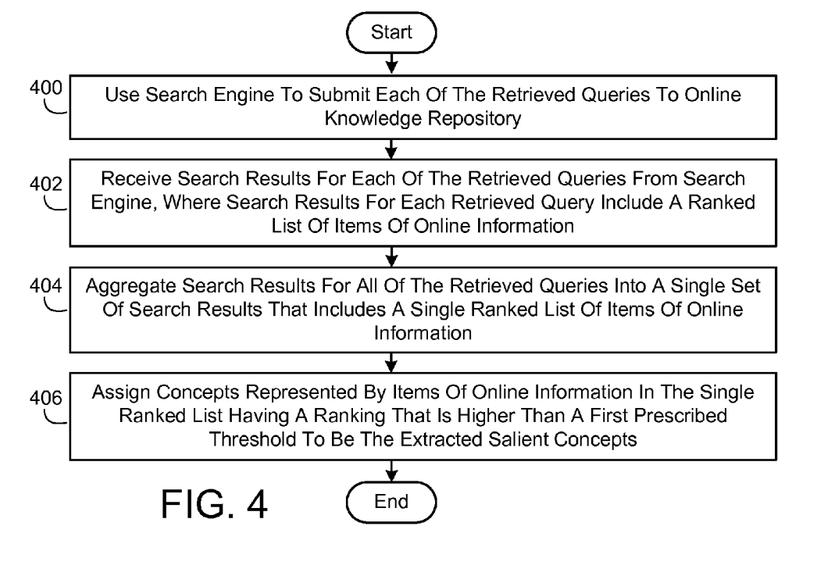
FIG. 4 is a flow diagram illustrating an exemplary embodiment, in simplified form, of a process for extracting salient concepts from the online knowledge repository for queries retrieved from the historical query log which are hypothesized to be semantically related to a segmented form of the original query.

Generally speaking, in another embodiment of the online search technique described herein salient concepts for the retrieved queries are extracted from the online knowledge repository by using each of the retrieved queries to query the repository via the search engine, and then assigning the concepts that are targeted by the top search results that are received from the search engine to be the extracted salient concepts. More particularly, FIG. 4 illustrates a process, in simplified form, for implementing this embodiment. As exemplified in FIG. 4, the process starts in block 400 with using the search engine to submit each of the retrieved queries to the online knowledge repository. Search results for each of the retrieved queries are then received from the search engine (block 402). The search results for each retrieved query include a ranked list of items of online information, where the ranking of each item in the list is based on its relevance to the retrieved query (as determined by the online knowledge repository). It will be appreciated that each item of online information in the ranked list represents a concept, where the concept name is specified within the particular information link that identifies the item (e.g., in the aforementioned online search technique embodiment where the information links are URLs, the concept name is encoded within the URL). In other words, the particular item of online information that is associated with a given information link provides a description of the concept specified within the link. Thus, the ranked list of items of online information returned by the online knowledge repository is equivalent to a ranked list of concepts.

Referring again to FIG. 4, once search results have been received for each of the retrieved queries (block 402), the search results for all of the retrieved queries are aggregated into a single set of search results that includes a single ranked list of items of online information (block 404). Thus, the single set of search results includes a single ranked list of concepts. Concepts represented by the items of online information in the single ranked list having a ranking that is higher than a first prescribed threshold are then assigned to be the extracted salient concepts (block 406).

By way of example but not limitation, in the case where the retrieved queries include those listed heretofore, the following are examples of the salient concepts for these retrieved queries that can be extracted from the online knowledge repository:

infant
fetus
puberty
adolescence
Jean Piaget
developmental psychology
Erikson's stages of psychosocial development
Fowler's stages of faith development
child development
child development stages
positive adult development
growth hormone deficiency
cognitive development
theory of cognitive development
human development Referring again to FIG. 3, once the salient concepts for the retrieved queries have been extracted from the online knowledge repository (block 304), the central concepts of the original query are determined from the extracted salient concepts (block 306). Generally speaking and as will be appreciated from the more detailed description that follows, these central concepts are the extracted salient concepts having the highest level of importance and thus are a subset of the extracted salient concepts. This central concept determination can be made in various ways which will now be described in more detail.

Figure 5:
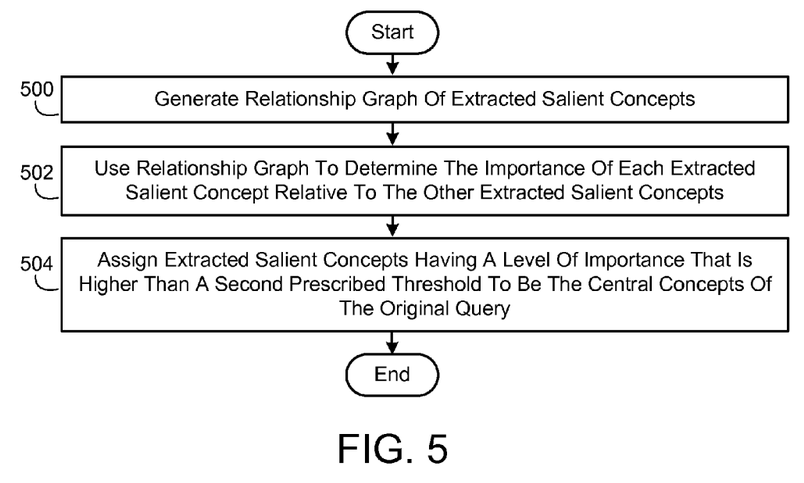
FIG. 5 is a flow diagram illustrating an exemplary embodiment, in simplified form, of a process for determining the central concepts of the original query from the extracted salient concepts.

FIG. 5 illustrates an exemplary embodiment, in simplified form, of a process for determining the central concepts of the original query from the extracted salient concepts. As exemplified in FIG. 5, the process starts in block 500 with generating a relationship graph of the extracted salient concepts, where for each particular extracted salient concept this graph specifies the relationships (e.g., the associations/interactions) between the particular extracted salient concept and the other extracted salient concepts. As is appreciated in the art of query graph derivation, the structure of the relationship graph is derived using information about each salient concept that is available in the online knowledge repository. In the aforementioned online search technique embodiment where Wikipedia® is employed as the online knowledge repository, information about each salient concept that is available in the repository includes, but is not limited to, concept linkage statistics (which specify how the salient concepts link to one another) and concept category information (which categorizes the salient concepts). Thus, the structure of the relationship graph can be derived by using the concept linkage statistics to determine the linkages between the extracted salient concepts, and using the concept category information to determine which extracted salient concepts are categorized in a common category. Concept co-occurrence information in the historical query log can also be used in the relationship graph generation. By way of example but not limitation, query sessions in the historical query log can be analyzed to determine which of the extracted salient concepts appear in queries that are in the same session. In the aforementioned online search technique embodiment where salient concepts for the retrieved queries are extracted from the online knowledge repository by using each of the retrieved queries to query the repository via the search engine, and then assigning the concepts that are targeted by the top items of online information in the search results that are received from the search engine to be the extracted salient concepts, the ranking of each item of online information in the single ranked list and/or information regarding particular information links the user may have selected for each retrieved query can optionally also be used in the relationship graph generation.

Referring again to FIG. 5, once the relationship graph of extracted salient concepts is generated (block 500), the graph is used to determine the importance of each extracted salient concept relative to the other extracted salient concepts (block 502). The extracted salient concepts having a level of importance that is higher than a second prescribed threshold are then assigned to be the central concepts of the original query (block 504).

Figure 6:
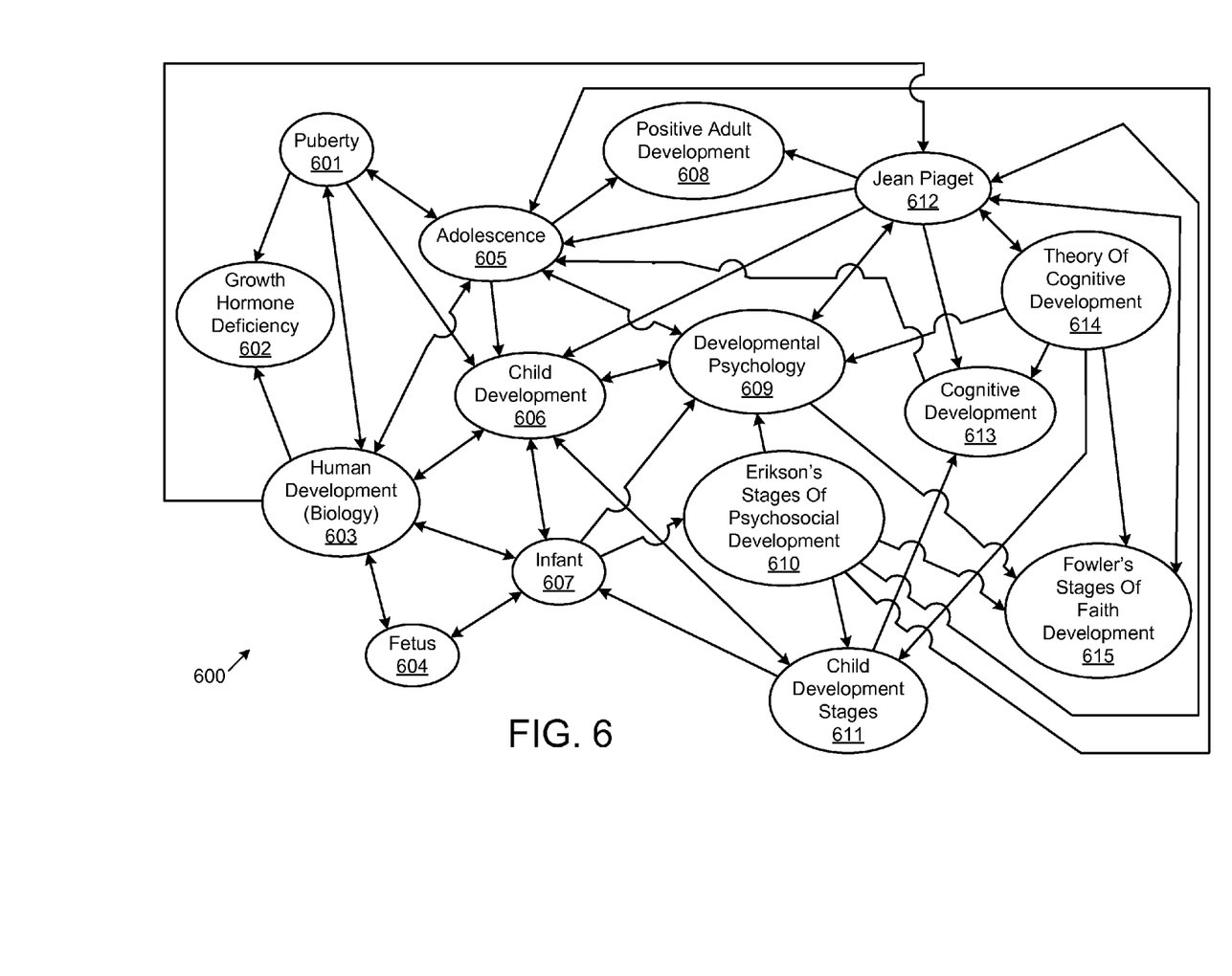
FIG. 6 is a diagram illustrating an exemplary embodiment, in simplified form, of a salient concepts relationship graph that is generated by the online search technique embodiments described herein.

FIG. 6 illustrates an exemplary embodiment, in simplified form, of a relationship graph that is generated in the case where the salient concepts that are extracted from the online knowledge repository are the ones listed heretofore. As exemplified in FIG. 6, the relationship graph 600 generally provides a navigable graphical representation of the extracted salient concepts 601-615 and the relationships there-between. Analysis of the relationship graph 600 indicates that child development 606 is the extracted salient concept having the highest level of importance relative to all the other extracted salient concepts 601-605 and 607-615.

Referring again to FIG. 3, once the central concepts of the original query have been determined from the extracted salient concepts (block 306), these central concepts are used to construct the revised query (block 308). This revised query construction can be implemented in various ways, some examples of which will now be described in more detail. Generally speaking, the revised query includes one or more of the central concepts of the original query. In certain embodiments of the online search technique described herein, the revised query may also employ one or more advanced operators of the search engine. More particularly and by way of example, but not limitation, in one embodiment of the online search technique the revised query includes just the central concept having the highest level of importance (i.e., the highest ranked central concept). In the case where the relationship graph of extracted salient concepts is that which is illustrated in FIG. 6, an exemplary revised query resulting from this embodiment is child development. In another embodiment of the online search technique the revised query includes the central concept having the highest level of importance and one or more other central concepts. In yet another embodiment of the online search technique the revised query includes one or more of the central concepts and one or more advanced operators of the search engine (such as the "RankOnly:" operator and the "Site:" operator, among others). In the case where the relationship graph of extracted salient concepts is that which is illustrated in FIG. 6, one exemplary revised query resulting from this embodiment is child development RankOnly:infant. As is appreciated in the art of online querying via a search engine, this query requests online information related to "child development", and further specifies to the search engine that search results which include the term "infant" are to be ranked higher than those which do not. Another exemplary revised query resulting from this embodiment is child development RankOnly:infant Site:en.wikipedia.org. This query yet further specifies to the search engine that the search is to be performed on the Wikipedia® knowledge repository.

Referring again to FIG. 2, the submission of the revised query to the search engine (block 204) can be implemented in various ways including, but not limited to, the following. In one embodiment of the online search technique described herein the revised query is submitted to the search engine instead of the original query. In another embodiment of the online search technique the revised query is submitted to the search engine in addition to the original query. In this case the aforementioned search engine interface can combine the search results for the revised query and the search results for the original query in various ways including, but not limited to, interleaving them.

2.3 System Framework

Figure 7:
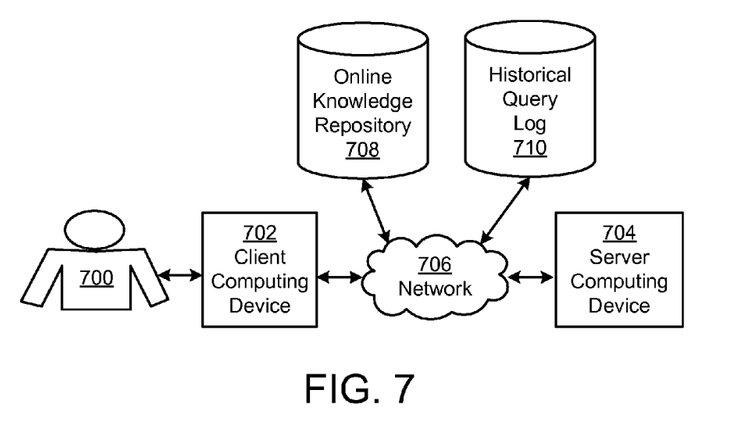
FIG. 7 is a diagram illustrating an exemplary system framework, in simplified form, for implementing the online search technique embodiments described herein.

FIG. 7 illustrates an exemplary system framework, in simplified form, for implementing the online search technique embodiments described herein. As exemplified in FIG. 7, the system framework includes a client computing device 702 which is used by a user 700, and a server computing device 704. The client 702 and server 704 are interconnected by a distributed communication network 706. As is appreciated in the art of communication networks, the network 706 can be either a public communication network such as the Internet (among others), or a private communication network such as an intranet (among others). The client 702 runs a search engine interface application (among other things) and the server 704 runs a query analyzer application (among other things). In one embodiment of the online search technique the server 704 also runs a search engine application. In another embodiment of the online search technique the search engine application runs on another server (not shown) which is also connected to the network 706. The aforementioned online knowledge repository 708 and historical query log 710 for the search engine application are also connected to the network 706. In an alternate embodiment of the online search technique (not shown) the historical query log for the search engine application can be implemented directly within whatever server runs the search engine application. An exemplary embodiment of how the search engine interface application running on the client 702 interacts with the query analyzer application running on the server 704 will now be described.

Figure 8:
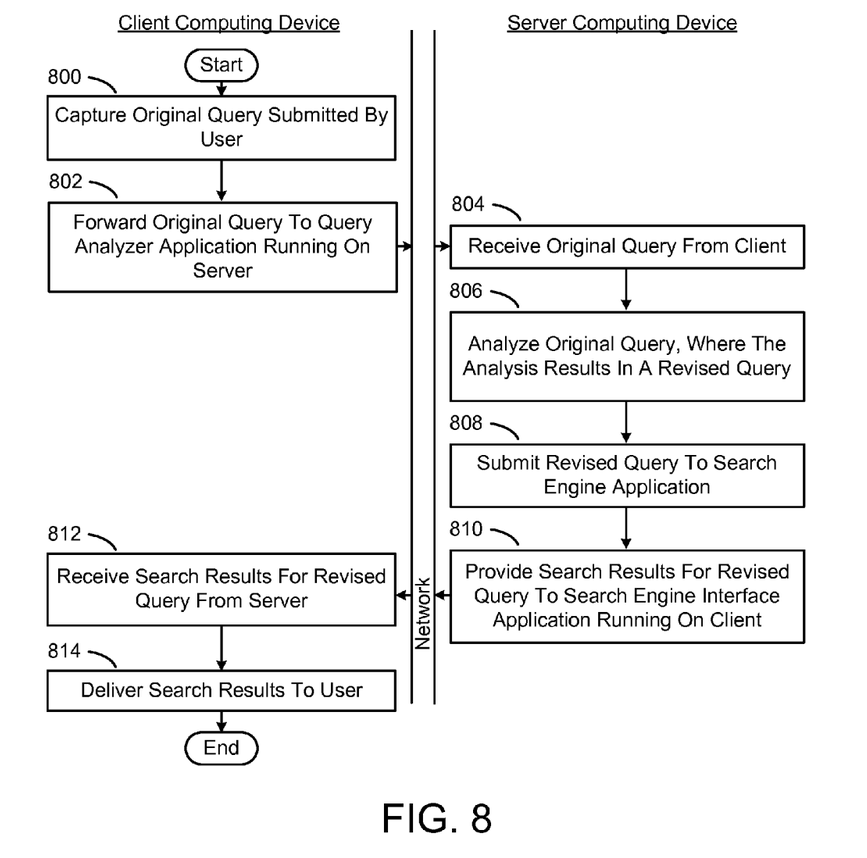
FIG. 8 is a diagram illustrating an exemplary embodiment, in simplified form, of a process for delivering online information to a user, where this process is based on the system framework exemplified in FIG. 7.

FIG. 8 illustrates an exemplary embodiment, in simplified form, of a process for delivering online information to a user, where this process is based on the system framework exemplified in FIG. 7. As exemplified in FIG. 8, the process starts in block 800 with the search engine interface application running on the client computing device capturing an original query that is submitted by the user, where the original query has the characteristics described heretofore. In the aforementioned case where the user employs a browser application to submit the original query, the search engine interface application captures the original query from the browser application. The search engine interface application then forwards the original query over the network to the query analyzer application running on the server computing device (block 802) for the generation of the aforementioned revised query. The query analyzer application then receives the original query from the client (block 804) and analyzes the original query in the manner described heretofore, where the analysis results in a revised query having the characteristics described heretofore (block 806). The query analyzer application then submits the revised query to the search engine application (block 808). The search engine application then provides search results for the revised query over the network to the search engine interface application (block 810). The search engine interface application then receives the search results for the revised query from the server (block 812), and delivers the search results to the user (block 814). It is noted that the search results can be delivered to the user in a variety of ways such as displaying them to the user, among others.

3.0 Additional Embodiments

While the online search technique has been described by specific reference to embodiments thereof, it is understood that variations and modifications thereof can be made without departing from the true spirit and scope of the online search technique. By way of example but not limitation, rather than the search engine interface application being run on the client as described heretofore, this application can also be run on the server.

It is also noted that any or all of the aforementioned embodiments can be used in any combination desired to form additional hybrid embodiments. Although the online search technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

4.0 Computing Environment

This section provides a brief, general description of a suitable computing system environment in which portions of the online search technique embodiments described herein can be implemented. These online search technique embodiments are operational with numerous general purpose or special purpose computing system environments or configurations. Exemplary well known computing systems, environments, and/or configurations that can be suitable include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the aforementioned systems or devices, and the like.

Figure 9:
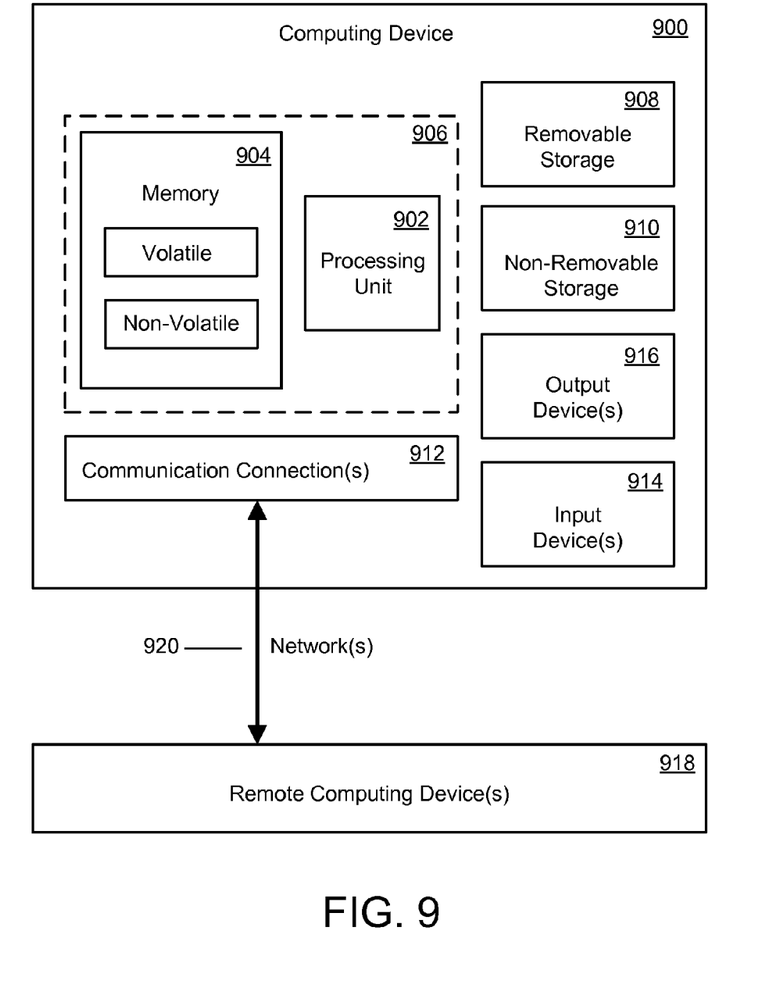
FIG. 9 is a diagram illustrating an exemplary embodiment, in simplified form, of a general purpose, network-based computing device which constitutes an exemplary system for implementing portions of the online search technique embodiments described herein.

FIG. 9 illustrates an exemplary embodiment, in simplified form, of a suitable computing system environment according to the online search technique embodiments described herein. The environment illustrated in FIG. 9 is only one example of a suitable computing system environment and is not intended to suggest any limitation as to the scope of use or functionality of the online search technique embodiments described herein. Neither should the computing system environment be interpreted as having any dependency or requirement relating to any one or combination of components exemplified in FIG. 9.

As exemplified in FIG. 9, an exemplary system for implementing portions of the online search technique embodiments described herein includes one or more computing devices, such as computing device 900. In its simplest configuration, computing device 900 typically includes at least one processing unit 902 and memory 904. Depending on the specific configuration and type of computing device, the memory 904 can be volatile (such as RAM), non-volatile (such as ROM and flash memory, among others) or some combination of the two. This simplest configuration is illustrated by dashed line 906.

As exemplified in FIG. 9, computing device 900 can also have additional features and functionality. By way of example, computing device 900 can include additional storage such as removable storage 908 and/or non-removable storage 910. This additional storage includes, but is not limited to, magnetic disks, optical disks and tape. Computer storage media typically embodies volatile and non-volatile media, as well as removable and non-removable media implemented in any method or technology. The computer storage media provides for storage of various information needed to operate the device 900 such as computer readable instructions associated with an operating system, application programs and other program modules, and data structures, among other things. Memory 904, removable storage 908 and non-removable storage 910 are all examples of computer storage media. Computer storage media includes, but is not limited to, RAM, ROM, EEPROM, flash memory or other memory technology, CD-ROM, digital versatile disks (DVD) or other optical disk storage technology, magnetic cassettes, magnetic tape, magnetic disk storage or other magnetic storage devices, or any other medium which can be used to store the desired information and which can be accessed by computing device 900. Any such computer storage media can be part of computing device 900.

As exemplified in FIG. 9, computing device 900 also includes a communications connection(s) 912 that allows the device to operate in a networked environment and communicate with a remote computing device(s), such as remote computing device(s) 918. Remote computing device(s) 918 can be any of the aforementioned computing systems, environments, and/or configurations, or can be a router, a peer device, or other common network node, and typically includes many or all of the elements described herein relative to computing device 900. Communication between computing devices takes place over a network(s) 920, which provides a logical connection(s) between the computing devices. The logical connection(s) can include one or more different types of networks including, but not limited to, a local area network(s) (LAN) and wide area network(s) (WAN). Such networking environments are commonplace in conventional offices, enterprise-wide computer networks, intranets and the Internet. It will be appreciated that the communications connection(s) 912 and related network(s) 920 described herein are exemplary and other means of establishing communication between the computing devices can be used.

As exemplified in FIG. 9, communications connection(s) 912 and related network(s) 920 are an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, radio frequency (RF), infrared, frequency modulation (FM) radio and other wireless media. The term "computer-readable medium" as used herein includes both the aforementioned storage media and communication media.

As exemplified in FIG. 9, computing device 900 also includes a user interface which includes one or more input devices 914 and one or more output devices 916. Exemplary input devices 914 include, but are not limited to, a keyboard, mouse, pen, touch input device, audio input device (such as a microphone and the like), and camera, among others. A user can enter commands and various types of information into the computing device 900 through the input device(s) 914. Exemplary output devices 916 include, but are not limited to, a display device(s), printer, and audio output devices (such as one or more loudspeakers, headphones, and the like), among others. These input and output devices are well known and need not be described at length here.

Referring again to FIG. 9, the online search technique embodiments described herein can be further described and/or implemented in the general context of computer-executable instructions, such as program modules, which are executed by computing device 900. Generally, program modules include routines, programs, objects, components, and data structures, among other things, that perform particular tasks or implement particular abstract data types. The online search technique embodiments can also be practiced in a distributed computing environment where tasks are performed by one or more remote computing devices 918 that are linked through a communications network 912/920. In a distributed computing environment, program modules can be located in both local and remote computer storage media including, but not limited to, memory 904 and storage devices 908/910. Still further, the aforementioned instructions could be implemented, in part or in whole, as hardware logic circuits, which may or may not include a processor.

Wherefore, what is claimed is:

1. A computer-implemented process for retrieving online information for a user, comprising:
   using a computer to perform the following process actions:
   receiving an original query submitted by the user, the original query comprising a plurality of query terms that the user associates with particular online information the user is interested in;
   analyzing the original query to determine central concepts of the original query, said analysis comprising,
      segmenting the original query by extracting main concepts therefrom, each extracted main concept comprising one or more of the query terms, and then,
      retrieving queries from a historical query log of a search engine which are hypothesized to be semantically related to the main concepts extracted from the segmented original query, said historical query log comprising said queries which were received from a collection of search engine users,
      extracting salient concepts from the retrieved queries from an online knowledge repository,
      determining the central concepts of the original query from the extracted salient concepts, said central concepts being determined from a relationship graph of salient concepts for said queries retrieved from said historical query log, and
      using said determined central concepts to construct a revised query;
   submitting the revised query to the search engine; and
   providing search results for the revised query to the user.

2. The process of claim 1, wherein the process action of segmenting the original query by extracting main concepts therefrom comprises an action of processing the original query using a trie search method based on data from the online knowledge repository.

3. The process of claim 1, wherein the process action of segmenting the original query by extracting main concepts therefrom comprises an action of processing the original query using a co-occurrence extraction method based on query term co-occurrence statistics from the historical query log of the search engine.

4. The process of claim 1, wherein the process action of segmenting the original query by extracting main concepts therefrom comprises an action of processing the original query using a combination of at least two different methods, said methods comprising,
   processing the original query using a trie search method based on data from the online knowledge repository, and
   processing the original query using a co-occurrence extraction method based on query term co-occurrence statistics from the historical query log of the search engine.

5. The process of claim 1, wherein the process action of retrieving queries from the historical query log of the search engine which are hypothesized to be semantically related to the main concepts extracted from the segmented original query comprises an action of retrieving queries from said log having at least two concepts in common with the segmented original query.

6. The process of claim 1, wherein the process action of retrieving queries from the historical query log of the search engine which are hypothesized to be semantically related to the main concepts extracted from the segmented original query comprises the actions of:
   identifying queries in said log having at least two concepts in common with the segmented original query; and
   for each identified query, retrieving queries from said log that follow the identified query in the same search session as the identified query and have at least one concept in common with the segmented original query.

7. The process of claim 1, wherein the process action of extracting salient concepts for the retrieved queries from the online knowledge repository comprises an action of using a concept extraction and disambiguation method to parse said retrieved queries as a single document.

8. The process of claim 7, wherein the concept extraction and disambiguation method comprises a large-scale named entity disambiguation method.

9. The process of claim 1, wherein the process action of extracting salient concepts for the retrieved queries from the online knowledge repository comprises the actions of:
 using the search engine to submit each of the retrieved queries to the online knowledge repository;
 receiving search results for each of the retrieved queries from the search engine,
  the search results for each retrieved query comprising a ranked list of items of online information each of which are identified by a different information link,
  the ranking of each item in the list being based on its relevance to said retrieved query, and
  each item in the list representing a concept whose name is specified within the information link that identifies the item;
 aggregating the search results for all of the retrieved queries into a single set of search results comprising a single ranked list of items of online information; and
 assigning concepts represented by items of online information in said single ranked list having a ranking that is higher than a first prescribed threshold to be the extracted salient concepts.

10. The process of claim 1, wherein the process action of determining the central concepts of the original query from the extracted salient concepts comprises the actions of:
 generating said relationship graph of the extracted salient concepts, said generation comprising using information about each salient concept that is available in the online knowledge repository;
 using the relationship graph of the extracted salient concepts to determine the importance of each extracted salient concept relative to the other extracted salient concepts; and
 assigning the extracted salient concepts having a level of importance that is higher than a prescribed importance level threshold to be the central concepts of the original query.

11. The process of claim 10, wherein either,
 the revised query comprises just the central concept having the highest level of importance, or
 the revised query comprises the central concept having the highest level of importance and one or more other central concepts, or
 the revised query comprises one or more of the central concepts and one or more advanced operators of the search engine.

12. The process of claim 10, wherein the information about each salient concept that is available in the online knowledge repository comprises concept linkage statistics and concept category information.

13. The process of claim 10, wherein the process action of generating a relationship graph of the extracted salient concepts further comprises using concept co-occurrence information in the historical query log of the search engine.

14. The process of claim 10, wherein,
 the process action of extracting salient concepts for the retrieved queries from the online knowledge repository comprises the actions of:
  using the search engine to submit each of the retrieved queries to the online knowledge repository,
  receiving search results for each of the retrieved queries from the search engine,
   the search results for each retrieved query comprising a ranked list of items of online information each of which are identified by a different information link,
   the ranking of each item in said list being based on its relevance to said retrieved query, and
   each item in said list representing a concept whose name is specified within the information link that identifies the item,
  aggregating the search results for all of the retrieved queries into a single set of search results comprising a single ranked list of items of online information, and
  assigning concepts represented by items of online information in the single ranked list having a ranking that is higher than a first prescribed threshold to be the extracted salient concepts; and
 the process action of generating a relationship graph of the extracted salient concepts further comprises using one or more of,
  the ranking of each item of online information in the single ranked list, and
  information regarding particular information links the user selected for each retrieved query.

15. The process of claim 1, wherein the original query comprises five or more query terms.

16. The process of claim 1, wherein the process action of submitting the revised query to the search engine comprises an action of submitting the revised query to the search engine instead of the original query.

17. The process of claim 1, wherein the process action of submitting the revised query to the search engine comprises an action of submitting the revised query to the search engine in addition to the original query.

18. A computer-implemented process for delivering online information to a user, comprising:
 using a computer to perform the following process actions:
 capturing an original query submitted by the user, the original query comprising a plurality of query terms that the user associates with particular online information the user is interested in;
 forwarding the original query to a query analyzer application for the generation of a revised query comprising one or more central concepts of the original query, said generation comprising the actions of:
  segmenting the original query by extracting main concepts therefrom, each extracted main concept comprising one or more of the query terms, and then,
  retrieving queries generated by a collection of search engine users found in a historical query log of a search engine comprising queries received from said collection of search engine users, the retrieved queries being hypothesized to be semantically related to the main concepts extracted from the segmented original query,
  extracting salient concepts for the retrieved queries from an online knowledge repository,
  generating a relationship graph of the extracted salient concepts,
  using the relationship graph to determine the central concepts of the original query, and
  using said determined central concepts to construct the revised query;
 receiving search results for the revised query; and
 displaying the search results to the user.

19. A computer-implemented process for retrieving online information for a user, comprising:
 using a computer to perform the following process actions:
 receiving an original query submitted by the user, wherein the original query comprises a plurality of query terms that the user associates with particular online information the user is interested in;
 segmenting the original query by extracting main concepts therefrom, wherein each extracted main concept comprises one or more of the query terms, and said segmentation comprises an action of processing the original query using a trie search method based on data from an online knowledge repository;

retrieving queries from a historical query log of a search engine which are hypothesized to be semantically related to the segmented original query, wherein said retrieval comprises an action of retrieving queries from said log having at least two concepts in common with the segmented original query;

extracting salient concepts for the retrieved queries from the online knowledge repository, wherein said extraction comprises an action of using a large-scale named entity disambiguation method to parse the retrieved queries as a single document;

determining central concepts of the original query from the extracted salient concepts, wherein said determination comprises the actions of,     generating a relationship graph of the extracted salient concepts, said generation comprising using information about each salient concept that is available in the online knowledge repository,     using the relationship graph to determine the importance of each extracted salient concept relative to the other extracted salient concepts, and     assigning the extracted salient concepts having a level of importance that is higher than a prescribed threshold to be the central concepts of the original query;

using said central concepts to construct a revised query comprising one or more of said central concepts;

submitting the revised query to the search engine; and providing search results for the revised query to the user.

\* \* \* \* \*